Nov. 11, 1930. W. R. BREWER 1,780,967
NONSKID DEVICE
Filed Aug. 19, 1929

Inventor
Wm R. Brewer
By Geo. Stevens
Attorney

Patented Nov. 11, 1930

1,780,967

UNITED STATES PATENT OFFICE

WILLIAM R. BREWER, OF DULUTH, MINNESOTA

NONSKID DEVICE

Application filed August 19, 1929. Serial No. 387,068.

This invention relates to traction elements for vehicle wheels and has special reference to a removable traction tread for automobile tires.

The principal object is to provide a more practical and efficient anti-skid or traction element than heretofore known.

Another object is to provide such a traction tread effectively operable irrespective of the motion of the wheel.

Other objects and advantages of the invention will appear in the following description thereof.

Referring now to the accompanying drawing forming part of this application and wherein like reference characters indicate like parts:

I propose to make these members sufficiently large to approximately meet about the peripheral center of the tire, or at least normally remain sufficiently close to each other as to avoid the sense of objectionable jar or vibration to the wheel when being rotated with the tread members thereupon.

The tread member proper, indicated at 1, is preferably in the form of an open rectangularly shaped unit, materially longer circumferentially the tire than transverse same, providing a narrow walled member designed to extend from the peripheral surface of the tire, and this member is disposed upon the tire in such a manner that two of its opposite vertices extend transverse the tire and on the same plane, while a diagonal through the other vertices falls centrally of the circumferential face of the tire.

The inner faces of the walls of the units are concaved and shaped to snugly fit against the convex face of the tire, while the other face thereof transverse the tire is straight but longitudinally of the tire curved preferably on a radius drawn from the center of the tire, or concentric with the tire. These tread members or units are preferably made of 40-45 point carbon cast steel, and at their corners upon the sides of the tire are provided with laterally projecting lugs or trunnions 2 circumferentially grooved as at 3 for the reception of the double hooked links 4 by which the tread member is attached to the links of the side chains 5 of any desired construction.

Figure 1:
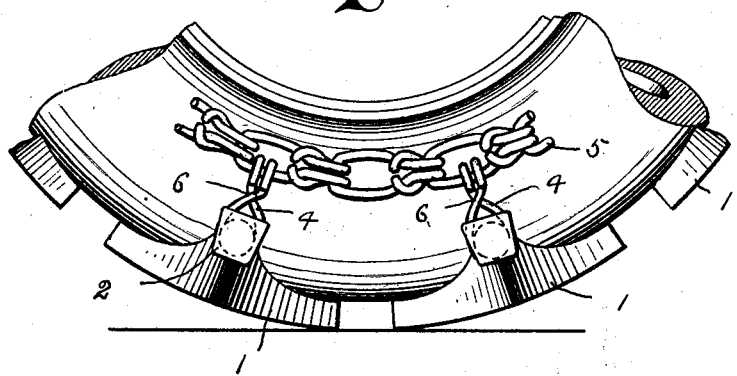
Figure 1 is a side elevation of a fragmental portion of a pneumatic tire having applied thereto one of my improved anti-skid chains or tread members.
Figures 2, 3:
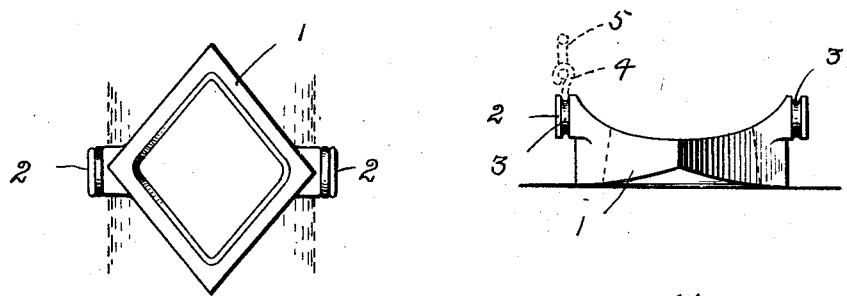
Figure 2 is a plan view of one of the tread members.
Figure 3 is an end elevation taken at right angles to Figure 1.

This attachment of the traction units to the side chains is novel in that the trunnions 2 are formed integral with each unit and are circumferentially grooved or channeled for the connecting links 5; the termini of each link being hooked outwardly for engagement with one side of one of the side chain links as clearly shown in Figure 1 of the drawings. The ends of this connecting link are crossed as at 6 to insure nonspreading thereof and at the same time forming a single positive and yieldable connection.

It will be noted that this form of rocking pivotal connection provides the essential freedom of each unit so as to prevent slipping of the unit on the tire or spinning of the latter within the units.

From the foregoing it is evident that I have devised a light and effective traction tread for tires for mounting as shown and having the appearance of diamond shaped tread members, two opposite corners of which tend to prevent slipping of the tire during rotation, and the opposite corners preventing the slipping of the tire sideways, and also presenting a bearing surface at all times the full length of the diagonals of said tread member.

Furthermore it will be apparent from the drawings that the side or obtuse angled corners of the members extend to the full width of the tire, and thus, when traveling around a corner, and the tire begins to roll, such action will force the succeeding corners of the members into the ice or snow, positively preventing side slipping.

It is evident also that any form of side chain may be used for the purpose of applying the traction treads to the tire, as the same forms no part of my present invention.

Having thus described my invention, what

I claim and desire to secure by Letters Patent, is:

In a traction increasing device having diamond shaped traction treads and side chains, means for connecting said treads to said side chains comprising holding trunnions upon opposite vertices of said treads, said trunnions characterized by having grooves formed thereabouts, and side chain connecting links within said grooves having their terminal ends overlapped and hooked into one side of a side chain link.

In testimony whereof I affix my signature.

WILLIAM R. BREWER.